US007899626B2

(12) United States Patent
Kruglyak et al.

(10) Patent No.: US 7,899,626 B2
(45) Date of Patent: Mar. 1, 2011

(54) SYSTEM AND METHOD OF MEASURING METHYLATION OF NUCLEIC ACIDS

(75) Inventors: Semyon Kruglyak, San Diego, CA (US); Marina Bibikova, San Diego, CA (US); Eugene Chudin, Kirkland, WA (US)

(73) Assignee: Illumina, Inc., San Diego, CA (US)

( * ) Notice: Subject to any disclaimer, the term of this patent is extended or adjusted under 35 U.S.C. 154(b) by 11 days.

(21) Appl. No.: 11/961,943

(22) Filed: Dec. 20, 2007

(65) Prior Publication Data

US 2008/0166728 A1 Jul. 10, 2008

Related U.S. Application Data

(60) Provisional application No. 60/884,353, filed on Jan. 10, 2007.

(51) Int. Cl.
*G06F 7/00* (2006.01)

(52) U.S. Cl. ............................ 702/19; 702/20; 703/11; 703/12; 703/13; 707/700; 435/6; 435/7.1

(58) Field of Classification Search ....................... None
See application file for complete search history.

(56) References Cited

U.S. PATENT DOCUMENTS 6,713,258 B2 * 3/2004 Kilian ........................... 435/6
7,153,671 B2 * 12/2006 Berlin ....................... 435/91.2
2004/0002818 A1 * 1/2004 Kulp et al. ..................... 702/20
2005/0164246 A1 * 7/2005 Fan et al. ....................... 435/6

OTHER PUBLICATIONS

Kuss et al. LC-GC Europe, Dec. 2003, pp. 1-4.*

Smith, Ian M, et al. "DNA Global Hypomethylation in Squamous Cell Head and Neck Cancer Associated with Smoking, Alcohol Consumption and Stage." International Journal of Cancer. 121.8 (2007): 1724-1728.

Ushijima Toshikzau, et al. "Decreased Fidelity In Replicating CpG Methylation Patterns in Cancer Cells." Cancer Research. 65.1 (2005): 11-17.

Zhao, Xinxin, et al. "Epigenetic Inheritance and Variation of DNA Methylation Level and Pattern In Maize Intra-Specific Hybrids." Plant Science. 172 (2007): 930-938.

BeadStudio Methylation Module User Guide: A Modular Tool for Illumina Data Analysis. Illumina Proprietary, 2006.

Illumina BeadStudio Data Analysis Software Module. Illumina Inc, 2006.

Bibikova, Marina, et al. "High-Throughput DNA Methylation Profiling Using Universal Bead Arrays." Genome Research. 16 (2006): 383-393. Dec. 6, 2006 <http://www.genome.org>.

"Media Release: Biotage Expands Pyrosequencing® Performance in Quantitative DNA Methylation Analysis for Clinical Cancer Research." Jul. 27, 2009. <http://www.pyrosequencing.com/Print.aspx?id=32517>.

Yang, Allen S., et al."A Simple Method For Estimating Global DNA Methylation Using Bisulfite PCR of Repetitive DNA Elements". Nucleic Acids Research. 32.3 (2004): 1-6.

Wirtz, Michaela, et al. "Determination of the DNA Methylation Level in Tumor Cells by Capillary Electrophoresis and Laser-Induced Fluorescence Detection." Electrophoresis. 25 (2004): 839-845.

Tost, Jorg, et al. "Analysis and Accurate Quantification of CpG Methylation by MALDI Mass Spectrometry." Nucleic Acids Research. 31.9 (2003): 1-10.

"Pyro Q-CpG™: Quantitative Analysis of Methylation in Multiple CpG sites by Pyrosequencing." Nature Methods. (2005): i-ii.

Weisenberger, Daniel J. "Analysis of repetitive element DNA methylation of MethyLight." Nucleic Acids Research. 33.21 (2005): 1-10.

* cited by examiner

*Primary Examiner*—Mary K Zeman
(74) *Attorney, Agent, or Firm*—Knobbe Martens Olson & Bear LLP

(57) ABSTRACT

The present embodiments relate to a system and method of measuring the methylation level of DNA. Some embodiments relate to a system and method of measuring methylation level of DNA with a gene array.

11 Claims, 5 Drawing Sheets

SYSTEM AND METHOD OF MEASURING METHYLATION OF NUCLEIC ACIDS

CROSS-REFERENCE TO RELATED APPLICATIONS

This application claims priority under 35 U.S.C. §119(e) to U.S. Provisional Application No. 60/884,353 filed on Jan. 10, 2007, which is hereby incorporated by reference in its entirety.

BACKGROUND OF THE INVENTION

1. Field of the Invention

The present embodiments relate to a system and method of measuring the methylation level of DNA. Some embodiments relate to a system and method of measuring methylation level of DNA with a nucleic acid array.

2. Description of the Related Art

Biomolecule methylation, such as DNA methylation is widespread and plays a critical role in the regulation of gene expression in development, differentiation and disease. Methylation in particular regions of genes, for example their promoter regions, can inhibit the expression of these genes (Baylin et al., (2000) *Trends Genet,* 16, 168-174.; Jones et al., (1999) *Nat Genet,* 21, 163-167.). Recent work has shown that the gene silencing effect of methylated regions is accomplished through the interaction of methylcytosine binding proteins with other structural compounds of the chromatin (Razin, A. (1998) *Embo J,* 17, 4905-4908.; Yan et al. (2001) *J Mammary Gland Biol Neoplasia,* 6, 183-192.), which, in turn, makes the DNA inaccessible to transcription factors through histone deacetylation and chromatin structure changes (Bestor, (1998) *Nature,* 393, 311-312.). Genomic imprinting in which imprinted genes are preferentially expressed from either the maternal or paternal allele also involves DNA methylation. Deregulation of imprinting has been implicated in several developmental disorders (Kumar (2000) *J Biosci,* 25, 213-214.; Sasaki et al., (1993) *Exs,* 64, 469-486.; Zhong et al., (1996) *Am J Med Genet,* 64, 415-419.).

In vertebrates, the DNA methylation pattern is established early in embryonic development and in general the distribution of 5-methylcytosine (5mC) along the chromosome is maintained during the life span of the organism (Razin et al., (1993) *Exs,* 64, 343-357.; Reik et al., (2001) *Science,* 293, 1089-1093.). Stable transcriptional silencing is critical for normal development, and is associated with several epigenetic modifications. If methylation patterns are not properly established or maintained, various disorders like mental retardation, immune deficiency and sporadic or inherited cancers may follow. The study of methylation is particularly pertinent to cancer research as molecular alterations during malignancy may result from a local hypermethylation of tumor suppressor genes, along with a genome wide demethylation (Schulz (1998) *Int J Oncol,* 13, 151-167.).

The initiation and the maintenance of the inactive X-chromosome in female eutherians were found to depend on methylation (Goto et al., (1998) *Microbiol Mol Biol Rev,* 62, 362-378.). Rett syndrome (RTT) is an X-linked dominant disease caused by mutation of MeCP2 gene, which is further complicated by X-chromosome inactivation (XCI) pattern. The current model predicts that MeCP2 represses transcription by binding methylated CpG residues and mediating chromatin remodeling (Dragich et al., (2000) *Hum Mol Genet,* 9, 2365-2375.).

It has become a major challenge in epidemiological genetics to relate a biological function (e.g. a disease) not only to the genotypes of specific genes but also to the potential differential expression levels of each allele of the genes. DNA methylation data can provide valuable information, in addition to the genotype. It has been a goal to provide methods to determine this information, e.g. if 0, or 1 or 2 chromosomes are methylated at particular genomic locations.

DNA methylation pattern changes at certain genes often alter their expression, which could lead to cancer metastasis, for example. Thus, studies of methylation pattern in selected, staged tumor samples compared to matched normal tissues from the same patient offers a novel approach to identify unique molecular markers for cancer classification. Monitoring global changes in methylation pattern has been applied to molecular classification in breast cancer (Huang et al., (1999) *Hum Mol Genet,* 8, 459-470.). In addition, many studies have identified a few specific methylation patterns in tumor suppressor genes (for example, p16, a cyclin-dependent kinase inhibitor) in certain human cancer types (Herman et al., (1995) *Cancer Res,* 55, 4525-4530.; Otterson et al., (1995) *Oncogene,* 11, 1211-1216.).

Restriction landmark genomic scanning (RLGS) profiling of methylation pattern of 1184 CpG islands in 98 primary human tumors revealed that the total number of methylated sites is variable between and in some cases within different tumor types, suggesting there may be methylation subtypes within tumors having similar histology (Costello et al., (2000) *Nat Genet,* 24, 132-138.). Aberrant methylation of a proportion of these genes correlates with loss of gene expression.

Since methylation detection can use genomic DNA, it offers advantages in both the availability of the source materials and ease of performing the assays. Also, the methylation assay can be complementary to those used for RNA-based gene expression profiling. Typically, the use of different assays in combination is more accurate and robust for disease classification and prediction than the use of only one assay.

Accordingly, there is a need for methods of evaluating methylation levels measured across a large number of loci in a genome and within the genomes of large number of individuals. The methods and compositions described herein satisfy this need and provide other advantages as well.

SUMMARY OF THE INVENTION

A method of measuring the methylation level of DNA is provided. The method can include the steps of providing data representing the standard deviation of methylation measurements of DNA, determining the methylation level of at least one locus in a sample DNA and comparing the methylation level of the at least one locus to the data to determine the standard deviation of the measurement.

A method of comparing the methylation level of DNA samples is also provided. The method can include the steps of providing data representing the standard deviation of methylation measurements of DNA; determining the methylation level of at least one locus in a first sample DNA; determining the methylation level of the at least one locus in a second sample DNA; identifying the standard deviations of the methylation level of the at least one locus in the first sample DNA and in the second sample DNA from the data; and determining whether the methylation level of the at least one locus in the first sample DNA and in the second sample DNA are the same or different based on the standard deviations.

Also provided is a DNA methylation level detection system, including a scanner for reading methylation levels for a plurality of loci in a sample DNA and a first module configured to compare the methylation levels against data representing the standard deviation of methylation measurements of DNA.

Some embodiments relate to a method of measuring the methylation level of DNA including providing data representing the standard deviation of methylation measurements of DNA; determining the methylation level of at least one locus in a sample DNA; and comparing the methylation level of said at least one locus to said data to determine the standard deviation of said measurement.

In some embodiments, at least one locus comprises a plurality of loci.

In some embodiments, the methylation levels are determined using an array.

In some embodiments the plurality of loci comprises at least 100 loci measured simultaneously on said array.

In some embodiments, the data correlates standard deviation of methylation level as a function of methylation level.

In some embodiments, the data comprises different standard deviation values for different methylation levels.

In some embodiments, the data comprises said different standard deviation values occurring along a parabola when correlated to said different methylation levels.

In some embodiments, the data is produced by creating a training set comprising mixtures of DNA with varying methylation levels, wherein said training set comprises replicates of said mixtures; determining the methylation level of at least one locus in said mixtures of said training set; determining standard deviation values for said methylation levels determined for said replicates of said training set; and correlating said standard deviation values and said methylation levels determined for said training set.

In some embodiments, the mixtures of the training set comprise different ratios of genomic DNA from a cell population with highly methylated DNA and a cell population with minimally methylated DNA.

In some embodiments, the methylation levels for the mixtures of said training set vary from 0 to 1.

Some embodiments further include identifying at least three regions from 0 to 1, determining the median of the methylation levels for each of the regions and fitting a parabola to said median for each of said regions.

In some embodiments, the standard deviation values comprise the 95$^{th}$ percentile standard deviation values.

Some embodiments further include the steps of determining the methylation level of said at least one locus in a second sample DNA; identifying the standard deviations of said methylation level of said at least one locus in said sample DNA and in said second sample DNA from said data; and determining whether said methylation level of said at least one locus in said first sample DNA and in said second sample DNA are the same or different based on said standard deviations.

Some embodiments relate to a DNA methylation level detection system including a scanner for reading methylation levels for a plurality of loci in a sample DNA; and a first module configured to compare said methylation levels against data representing the standard deviation of methylation measurements of DNA.

In some embodiments, the methylation levels are determined using an array.

In some embodiments, the plurality of loci comprises at least 100 loci measured simultaneously on said array.

In some embodiments, the data correlates standard deviation of methylation level as a function of methylation level.

In some embodiments, the data comprises different standard deviation values for different methylation levels.

In some embodiments, the data comprises said different standard deviation values occurring along a parabola when correlated to said different methylation levels.

In some embodiments, the data is produced by creating a training set comprising mixtures of DNA with varying methylation levels, wherein said training set comprises replicates of said mixtures; determining the methylation level of at least one locus in said mixtures of said training set; determining standard deviation values for said methylation levels determined for said replicates of said training set; and correlating said standard deviation values and said methylation levels determined for said training set.

In some embodiments, the mixtures of said training set comprise different ratios of genomic DNA from at least one cell population with highly methylated DNA and at least one cell population with minimally methylated DNA.

In some embodiments, the methylation levels for said mixtures of said training set vary from 0 to 1.

Some embodiments further include identifying at least three regions from 0 to 1, determining the median of the methylation levels for each of said regions and fitting a parabola to said median for each of said regions.

In some embodiments, the standard deviation values comprise the 95$^{th}$ percentile standard deviation values.

Some embodiments relate to a method of comparing the methylation level of DNA samples including providing data representing the standard deviation of methylation measurements of DNA; determining the methylation level of at least one locus in a first sample DNA; determining the methylation level of said at least one locus in a second sample DNA; identifying the standard deviations of said methylation level of said at least one locus in said first sample DNA and in said second sample DNA from said data; and determining whether said methylation level of said at least one locus in said first sample DNA and in said second sample DNA are the same or different based on said standard deviations.

In some embodiments, the first sample DNA and said second DNA sample are from different individuals.

In some embodiments, the first sample DNA and said second DNA sample are from different tissues.

In some embodiments, the different tissues are from the same individual.

In some embodiments, the different tissues are differentially affected by a disease or condition.

DETAILED DESCRIPTION

Figure 1:
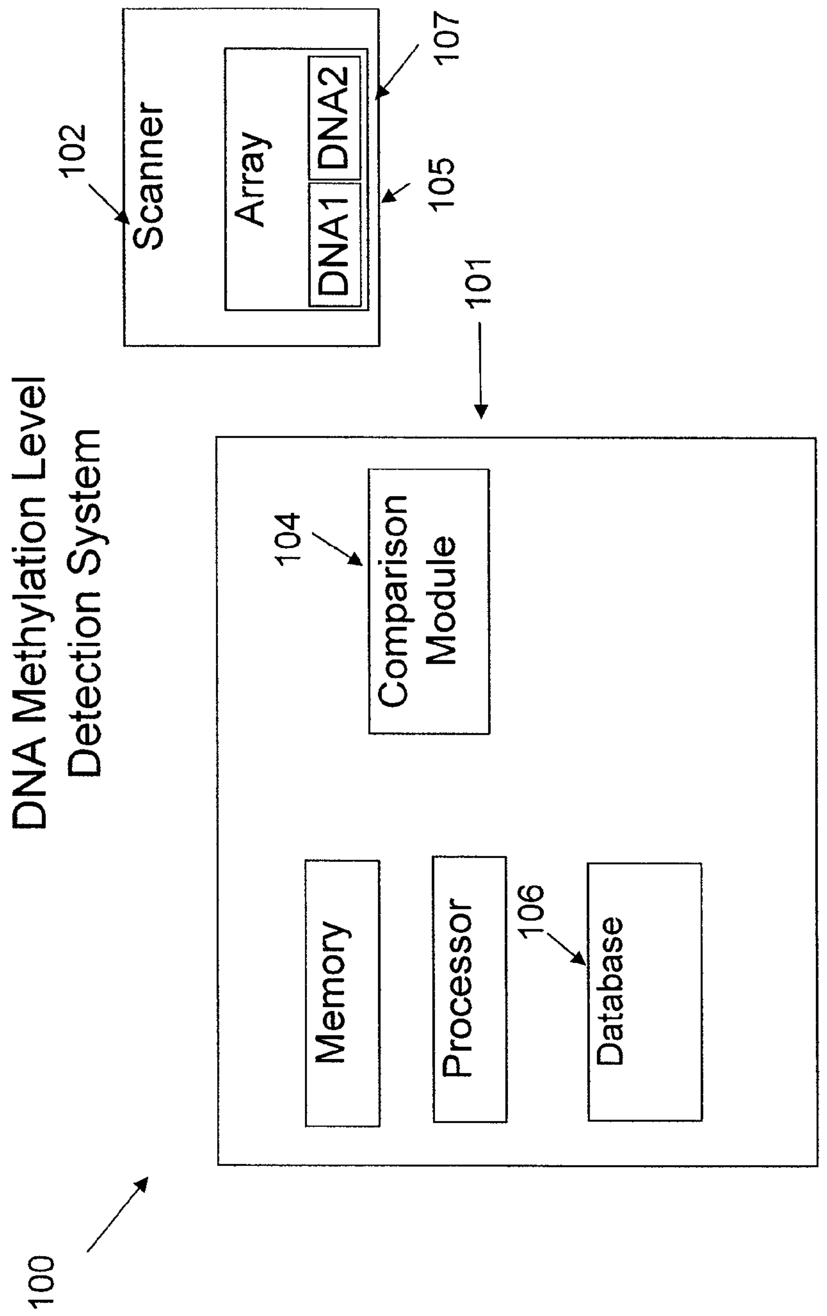
FIG. 1 is a schematic drawing of one embodiment of a DNA methylation level detection system.

The present embodiments relate to a system and method of measuring the methylation level of DNA. Some embodiments relate to a system and method of measuring methylation level of DNA with a nucleic acid array. Some embodiments relate to a method of comparing two or more samples of DNA to determine if the methylation level of the samples of DNA are the same or different at one or more locus.

DNA methylation levels are important data that are useful in many biological assays and studies. Very often, the comparison of methylation levels at particular loci between different populations of cells is of particular interest. Many methods of determining DNA methylation levels exist, all of which have a corresponding error level. One embodiment of the invention includes a system and method for determining whether or not a measured difference in DNA methylation level at a particular locus or loci between two or more cell populations is within the error associated with the measurements. As can be imagined, if the error associated with two measurements is unknown, then it can be difficult to determine if the two measurements are actually different from one another. For example, methylation measurements that yield values of 0.1 and 0.5 may not be different from one another if the error in each measurement is 0.5. However, if the error in the values is 0.1, then one can determine that a difference of 0.1 and 0.5 indicates a statistically significant difference between the two measurements.

As set forth in further detail below, a surprising correlation has been demonstrated between methylation levels and their standard deviations. The correlation is such that for different methylation levels the magnitude of the standard deviation is different. In particular embodiments, the magnitude of standard deviation values can differ along a parabolic function in a plot of methylation level vs. standard deviation. For example, as shown by the parabolic fit to the range of methylation levels in FIG. 3, standard deviations can be larger for methylation levels in the middle of the range (such as those near 0.5) than those near the ends of the range (such as those near 0.1 or 0.9).

Furthermore, a correlation of methylation levels with standard deviations that are identified for reference DNA samples from a first biological source can be used in the analysis of methylation levels determined for test DNA samples that are derived from a different biological source. The analysis used for determining methylation level of the test DNA can be performed independent of the analysis for determining the correlation. This provides the advantage of avoiding the need for evaluating a large number of samples each time statistical parameters are desired for a particular test measurement. Rather, the statistical power of a previous analysis can be leveraged such that methylation levels for a single test DNA sample are compared to data from a previously determined correlation. Standard deviation data can be derived from this comparison. An exemplary analysis that benefits from this statistical power is the determination of whether two methylation levels are statistically similar or different. Accordingly, in some embodiments, the system and methods described herein allow determination of whether two experimentally determined methylation levels are different by reference to the standard deviation for each methylation level. In particular embodiments, the standard deviations can be correlated to methylation levels in a look-up table of methylation levels and their respective standard deviations, or in a graph of standard deviation values as a function of measured methylation level values.

Figure 3:
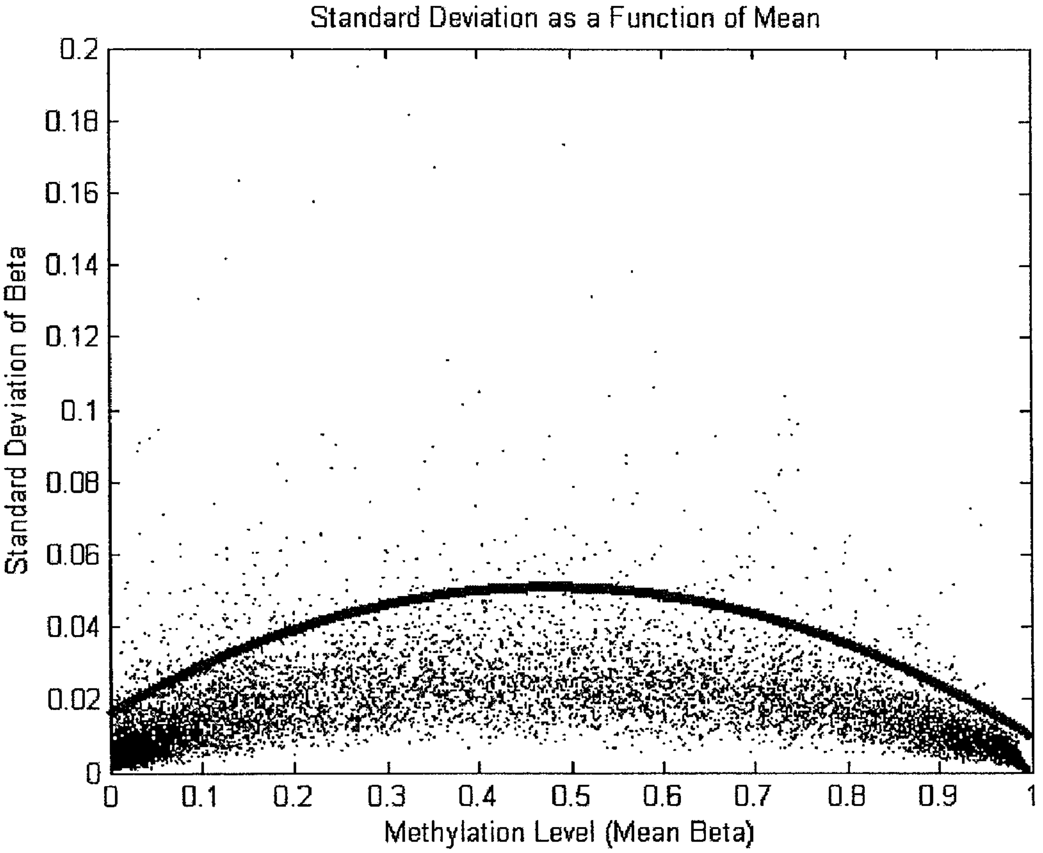
FIG. 3 represents an example of a graph of standard deviation of DNA methylation level as a function of the value of DNA methylation level.

Some embodiments relate to a method for estimating standard deviation of DNA methylation as a function of the mean DNA methylation level for a particular locus or a particular plurality of loci in reference DNA samples used as a training set. The methylation levels can be empirically determined for each reference DNA sample in the training set using a methylation detection method, such as a method that is selected among those set forth herein below or otherwise known in the art. The empirically determined methylation levels can be compared to methylation levels that are known or expected for the reference DNA samples and standard deviations can be determined for each methylation level. In particular embodiments, the resulting training data set can be evaluated to identify a function that correlates the methylation levels to the standard deviations. As shown in FIG. 3, in the case of methylation value β (beta), the standard deviation of differs as a function of the value of β. In some embodiments, the functional form is parabolic. In some embodiments, 3 points are selected from a training data set and a parabolic fit is computed to describe the relationship between the standard deviation of β and the value of β. Although the method is exemplified using a parabola fit using three points, other fitting procedures are also possible. For example, least squares fitting can be used to fit a curve to the data. Furthermore the fitting methods although exemplified for β values can be applied to methylation levels provided in other formats or representations. This data can then be used to estimate standard deviation of β for any β value between 0 and 1.

The methylation level of a locus in a DNA sample can be determined using any of a variety of methods capable of distinguishing presence or absence of a methyl group on a nucleotide base of the DNA. Methylation of DNA, when present, typically occurs as 5-methylcytosine (5-mCyt) in CpG dinucleotides. Methylation of CpG dinucleotide sequences or other methylated motifs in DNA can be measured using any of a variety of techniques used in the art for the analysis of specific CpG dinucleotide methylation status. For example, methylation can be measured by employing a restriction enzyme based technology, which utilizes methylation sensitive restriction endonucleases for the differentiation between methylated and non-methylated cytosines. Restriction enzyme based technologies include, for example, restriction digest with methylation-sensitive restriction enzymes followed by Southern blot analysis, use of methylation-specific enzymes and PCR, restriction landmark genomic scanning (RLGS) or differential methylation hybridization (DMH).

Restriction enzymes characteristically hydrolyze DNA at and/or upon recognition of specific sequences or recognition motifs that are typically between 4- to 8-bases in length. Among such enzymes, methylation sensitive restriction enzymes are distinguished by the fact that they either cleave, or fail to cleave DNA according to the cytosine methylation state present in the recognition motif, such as a CpG dinucleotide motif. In methods employing such methylation sensitive restriction enzymes, the digested DNA fragments can be separated, for example, by gel electrophoresis, on the basis of size, and the methylation status of the sequence is thereby deduced, based on the presence or absence of particular fragments. Preferably, a post-digest PCR amplification step is added wherein a set of two oligonucleotide primers, one on each side of the methylation sensitive restriction site, is used to amplify the digested genomic DNA. PCR products are not detectable where digestion of the subtended methylation sensitive restriction enzyme site occurs.

Techniques for restriction enzyme based analysis of genomic methylation are well known in the art and include the following: differential methylation hybridization (DMH) (Huang et al., *Human Mol. Genet.* 8, 459-70, 1999); Not I-based differential methylation hybridization (see e.g., WO 02/086163 A1); restriction landmark genomic scanning (RLGS) (Plass et al., *Genomics* 58:254-62, 1999); methylation sensitive arbitrarily primed PCR (AP-PCR) (Gonzalgo et al., *Cancer Res.* 57: 594-599, 1997); methylated CpG island amplification (MCA) (Toyota et. al., *Cancer Res.* 59: 2307-2312, 1999). Other useful methods for detecting genomic methylation are described, for example, in US Pat. App. pub. No. 2003/0170684 or WO 04/05122. Each of the above references is incorporated herein by reference.

Methylation of CpG dinucleotide sequences also can be measured by employing cytosine conversion based technologies, which rely on methylation status-dependent chemical modification of CpG sequences within isolated genomic DNA, or fragments thereof, followed by DNA sequence analysis. Chemical reagents that are able to distinguish between methylated and non methylated CpG dinucleotide sequences include hydrazine, which cleaves the nucleic acid, and bisulfite treatment. Bisulfite treatment followed by alkaline hydrolysis specifically converts non-methylated cytosine to uracil, leaving 5-methylcytosine unmodified as described by Olek A., *Nucleic Acids Res.* 24:5064-6, 1996 or Frommer et al., *Proc. Natl. Acad. Sci. USA* 89:1827-1831 (1992), each of which is incorporated herein by reference. The bisulfite-treated DNA can subsequently be analyzed by conventional molecular techniques, such as PCR amplification, sequencing, and detection comprising oligonucleotide hybridization. A particularly useful method for determining the methylation level for a DNA sample is described in Example 1 below and in Bibikova et al., *Genome Research,* 16:383-393 (2006), which is incorporated herein by reference.

Techniques for the analysis of bisulfite treated DNA can employ methylation-sensitive primers for the analysis of CpG methylation status with isolated genomic DNA as described by Herman et al., *Proc. Natl. Acad. Sci. USA* 93:9821-9826, 1996, and in U.S. Pat. Nos. 5,786,146 and 6,265,171, each of which is incorporated herein by reference. Methylation sensitive PCR (MSP) allows for the detection of a specific methylated CpG position within, for example, the regulatory region of a gene. The DNA of interest is treated such that methylated and non-methylated cytosines are differentially modified, for example, by bisulfite treatment, in a manner discernable by their hybridization behavior. PCR primers specific to each of the methylated and non-methylated states of the DNA are used in a PCR amplification. Products of the amplification reaction are then detected, allowing for the deduction of the methylation status of the target locus, such as a target CpG site, within the genomic DNA. Other methods for the analysis of bisulfite treated DNA include methylation-sensitive single nucleotide primer extension (Ms-SNuPE) (Gonzalgo & Jones, *Nucleic Acids Res.* 25:2529-2531, 1997; and see U.S. Pat. No. 6,251,594, each of which is incorporated herein by reference), and the use of real time PCR based methods, such as the art-recognized fluorescence-based real-time PCR technique MethyLight™. (Eads et al., *Cancer Res.* 59:2302-2306, 1999; U.S. Pat. No. 6,331,393; and Heid et al., *Genome Res.* 6:986-994, 1996, each of which is incorporated herein by reference).

Methods such as those set forth above can be used to determine the methylation level of at least one locus in a sample DNA of interest. In some embodiments, one locus on the sample DNA is measured. In other embodiments the methylation level for a plurality of loci is determined. Methylation levels for large pluralities of loci can be determined using a nucleic acid array. A nucleic acid array provides a convenient platform for simultaneous analysis of large numbers of loci including, for example, at least 2, 3, 4, 5, 6, 7, 8, 9, 10, 50, 100, 500, 1000, 5000, 10,000, 100,000 or more loci. Methods set forth herein can be used to analyze or evaluate such pluralities of loci simultaneously or sequentially as desired. In particular embodiments, a plurality of different probe molecules can be attached to a substrate or otherwise spatially distinguished in an array. Each probe is typically specific for a particular locus and can be used to distinguish methylation state of the locus. Exemplary arrays that can be used in the invention include, without limitation, slide arrays, silicon wafer arrays, liquid arrays, bead-based arrays and others known in the art or set forth in further detail below.

In particular embodiments, microspheres or beads useful for detecting methylation level for one or more loci can be arrayed or otherwise spatially distinguished. Exemplary bead-based arrays that can be used in the invention include, without limitation, those in which beads are associated with a solid support such as those commercially available from Illumina, Inc. (San Diego, Calif.) and those described in U.S. Pat. No. 6,355,431 B1, US 2002/0102578 and PCT Publication No. WO 00/63437. An array of beads useful in the invention can also be in a fluid format such as a fluid stream of a flow cytometer or similar device. Exemplary formats that can be used in the invention to distinguish beads in a fluid sample using microfluidic devices are described, for example, in U.S. Pat. No. 6,524,793. Commercially available fluid formats for distinguishing beads include, for example, those used in XMAP™ technologies from Luminex or MPSS™ methods from Lynx Therapeutics.

Any of a variety of arrays known in the art can be used in the present invention. For example, arrays that are useful in the invention can be non-bead-based. A particularly useful array is an Affymetrix™ GeneChip™ array or other arrays produced by photolithographic methods such as those described in WO 00/58516; U.S. Pat. Nos. 5,143,854, 5,242,974, 5,252,743, 5,324,633, 5,445,934, 5,744,305, 5,384,261, 5,405,783, 5,424,186, 5,451,683, 5,482,867, 5,491,074, 5,527,681, 5,550,215, 5,571,639, 5,578,832, 5,593,839, 5,599,695, 5,624,711, 5,631,734, 5,795,716, 5,831,070, 5,837,832, 5,856,101, 5,858,659, 5,936,324, 5,968,740, 5,974,164, 5,981,185, 5,981,956, 6,025,601, 6,033,860, 6,040,193, 6,090,555, 6,136,269, 6,269,846, 6,022,963, 6,083,697, 6,291,183, 6,309,831 and 6,428,752; and in WO 99/36760, each of which is incorporated herein by reference. A spotted array can also be used in a method of the invention. An exemplary spotted array is a CodeLink™ Array available from Amersham Biosciences. Another array that is useful in the invention is one manufactured using inkjet printing methods such as SurePrint™ Technology available from Agilent Technologies.

Probes used in an array can be specific for the methylated allele of a locus, the non-methylated allele of the locus or both alleles. Specificity can result, for example, from complementarity of a nucleic acid probe to the sequence of one or both alleles or to the sequence of a detection probe that is specifically modified in the presence of one or both alleles (for example, via bisulfite treatment). Specificity can also be a function of probe modification that occurs in a target-specific fashion. For example, a probe that binds both alleles of a locus can be extended to incorporate a different nucleotide in a template-directed polymerase extension event depending upon the allele that is hybridized to the probe. Examples of probe modification reactions that can be used to provide specificity for particular alleles are known in the art as described, for example, in US 2005/0181394, which is incorporated herein by reference. A probe used in an array can also be specific for other detection probes that are modified in the presence of the methylated or non-methylated allele of a locus, such as the address sequence of a ligation probe used in the DNA methylation detection method as described, for example, in Bibikova et al., *Genome Research,* 16:383-393

(2006). Arrays that achieve specificity via probes with sequences that are complementary to address sequences rather than to the sequence of methylated loci are referred to as universal arrays.

A DNA sample used in a method set forth herein can be obtained from any biological fluid, cell, tissue, organ or portion thereof, that contains genomic DNA suitable for methylation detection. The DNA sample can be derived from a biological source by isolation techniques or amplification techniques or a combination of these techniques. A sample can include or be suspected to include a neoplastic cell, such as a cell from the colon, rectum, breast, ovary, prostate, kidney, lung, blood, brain or other organ or tissue that contains or is suspected to contain a neoplastic cell. The methods can use samples present in an individual as well as samples obtained or derived from the individual. For example, a sample can be a histologic section of a specimen obtained by biopsy, or cells that are placed in or adapted to tissue culture or cells that are stored, for example, as fresh frozen paraffin embedded samples. A sample further can be a subcellular fraction or extract, or a crude or substantially pure nucleic acid molecule.

A sample can be obtained in a variety of ways known in the art. Samples may be obtained according to standard techniques from all types of biological sources that are usual sources of genomic DNA including, but not limited to cells or cellular components which contain DNA, cell lines, biopsies, bodily fluids such as blood, sputum, stool, urine, cerebrospinal fluid, ejaculate, tissue embedded in paraffin such as tissue from eyes, intestine, kidney, brain, heart, prostate, lung, breast or liver, histological object slides, and all possible combinations thereof. Furthermore, genomic DNA can be amplified or copied such that the sequence information and methylation state of the genomic DNA is converted to another nucleic acid form such as RNA, cDNA, cRNA or the like.

The methylation level for a locus in a DNA sample can be provided in any of a variety of formats or representations that are convenient for the particular methylation method used and for subsequent analysis. A format or representation for methylation level of a locus can be any that is indicative of the extent to which the locus has a methylated nucleotide. Several of the methylation detection methods set forth herein and otherwise known in the art are used under conditions in which multiple copies of a locus are evaluated. Each individual copy can be methylated or non-methylated such that the population as a whole is either homogeneous, being entirely methylated or entirely non-methylated, or heterogeneous, being composed of copies that are methylated as well as copies that are non-methylated. Accordingly, methylation level for a locus can be represented as a ratio of methylated copies to non-methylated copies of the locus in a DNA sample. Similarly, methylation level can be represented as the percentage or fraction of the copies of a locus that are either methylated or non-methylated.

A particularly useful representation for methylation level is beta (β) value as shown in Formula 1.

$$\beta = \mathrm{Max}(M,0)/\mathrm{Max}(U,0)+\mathrm{Max}(M,0)+100 \quad \text{(Formula 1)}$$

In formula 1, Max(M,0) is normalized signal intensity for the methylated version of a locus after background subtraction, and Max(U,0) is normalized signal intensity for the non-methylated (also referred to as "unmethylated") version of the locus after background subtraction. A constant offset of 100 is added to the denominator of the formula, as a compensation for any "negative signals" which may arise from global background subtraction (i.e. over-subtraction). As such, the β value reflects the methylation status of each locus, ranging from 0 in the cases of a completely non-methylated population of sites to 1 in a completely methylated population of sites. Beta value is described in further detail in Bibikova et al., *Genome Research,* 16:383-393 (2006). Throughout this document the terms "non-methylated" and "unmethylated" are used interchangeably and are intended to be synonymous. Both terms are intended to indicate the absence of a methyl group and neither is intended to indicate whether or not a methyl group was previously present, unless explicitly stated otherwise.

Another format for presenting methylation level include percent of methylated reference (PMR) as used in the MethyLight method as described in Weisenberger et al., Nucleic Acids Res. 33: 6823-6836 (2005). Also useful is a format in which methylation level is described by percent of methylation as used in the Pyrosequencing methods available from Biotage AB (Charlottesville, Va.).

Methylation level can be based on the amount of signal detected for a methylated allele of a locus or the amount of signal for the non-methylated allele of the locus, for example, as set forth above. Further examples of methylation levels that can be based on signal amounts include, but are not limited to, a ratio of the signal for one allele to the signal for the other allele, the fraction of the signal for one allele to the total amount of signal for both alleles, or the percentage of the signal for one allele with respect to the total amount of signal for both alleles. Other representations for methylation level that are known in the art can also be used.

A method of measuring the methylation level of DNA can include a step in which data representing the standard deviation of methylation measurements of DNA is provided. Typically, the data correlates standard deviation of methylation level as a function of methylation level. The correlation can be provided, for example, in the form of a look-up table, in the form of a graph or plot, or in the form of an equation. In particular embodiments, the data is provided in a computer readable format such as a floppy disk, compact disk, flash memory card, hard drive, server, or other form of computer memory.

In some embodiments, the data representing the standard deviation of DNA methylation is produced by creating a training set including mixtures of DNA with varying methylation levels; determining the methylation level of at least one locus in the mixtures of the training set; determining standard deviation values for the methylation levels determined for the training set; and correlating the standard deviation values and the methylation levels determined for the training set. In some embodiments, the training set further includes replicates of each mixture and the standard deviation values can be determined for the replicates in the training set. Table 1 below is an example of the data representing the standard deviation of methylation measurements of DNA that can be obtained from such a training set.

TABLE 1

| | Mean β | | | | | | | | | | |
|---|---|---|---|---|---|---|---|---|---|---|---|
| | 0 | 0.1 | 0.2 | 0.3 | 0.4 | 0.5 | 0.6 | 0.7 | 0.8 | 0.9 | 1.0 |
| Std. Dev. of β | 0.015 | 0.03 | 0.04 | 0.045 | 0.05 | 0.055 | 0.05 | 0.045 | 0.04 | 0.03 | 0.01 |

A reference DNA used in a training set typically has methylation levels for one or more loci that are known or expected. A reference DNA can have a methylation level that is known or expected based on properties of the biological source of the DNA. For example, a reference DNA can be obtained from a cell that is known or expected to produce highly methylated genomic DNA or from a cell that is known or expected to produce genomic DNA that is substantially non-methylated. In particular embodiments, a reference DNA can be produced by in vitro methods that are known or expected to produce a particular methylation level at one or more loci. For example, a DNA can be treated with a chemical or enzymatic reagent that transfers methyl groups to particular nucleotides or loci in the DNA to produce methylated DNA. Alternatively, a DNA can be amplified under conditions that replicate the nucleotide sequence of the DNA but do not replicate the methylation state of the DNA, thereby producing non-methylated DNA. This is the case for most amplification methods such as PCR will produce non-methylated DNA independent of the methylation state of the template that is amplified.

Mixtures of methylated DNA and substantially non-methylated DNA can be formed for use in a training set. In some embodiments, the mixtures of the training set can have different ratios of genomic DNA from a cell population with highly methylated DNA and a cell population with minimally methylated DNA. The mixture can include any population of DNA, either synthesized or naturally occurring from any species. Highly methylated DNA substantially includes DNA with β values from about 0.5 to about 1.0, preferably from about 0.8 to about 1.0 or from about 0.9 to about 1.0 and is understood to optionally contain some DNA with β values below about 0.5. Minimally methylated DNA substantially includes DNA with β values from about 0 to about 0.5, preferably from about 0 to about 0.2 or from about 0 to about 0.1 and is understood to optionally contain some DNA with β values above about 0.5.

Several reference DNA samples each having a different known or expected methylation level can be included in a training set such that the training set covers a range of methylation levels. As demonstrated in Example 1, a training set including reference DNA samples having beta values across the range from 0 to 1 can be formed by mixing highly methylated DNA in different ratios with DNA that is substantially non-methylated. Those skilled in the art will recognize that the number of mixtures used in a training set can be greater than or smaller than the number used in Example 1.

Some embodiments involve identifying at least three regions within the range of values for β from 0 to 1 and determining the median of the methylation levels for each of the regions. In some embodiments, this can be represented by a graph of the standard deviation of the methylation level β as a function of the value of β (see FIG. 3). In some embodiments, a parabola can be fit to the median for each of the regions. In some embodiments, the standard deviation values include the $95^{th}$ percentile standard deviation values. It will be understood that other percentile standard deviation values can be used. Furthermore, other statistical measures of deviation or difference between two or more values can be used as desired.

In some embodiments, the methylation level of a second sample DNA and the corresponding standard deviation of the methylation level of the second sample DNA is determined as described above for the original first sample DNA. Then it is determined whether the methylation level of at least one locus in the first sample DNA and in the second sample DNA are the same or different based on the corresponding standard deviations.

Accordingly, a method of comparing the methylation level of DNA samples is provided. The method can include the steps of providing data representing the standard deviation of methylation measurements of DNA, determining the methylation level of at least one locus in a first sample DNA, determining the methylation level of at least one locus in a second sample DNA, identifying the standard deviations of the methylation level of at least one locus in the first sample DNA and in the second sample DNA from the data, and then determining whether the methylation level of at least one locus in the first sample DNA and in the second sample DNA are the same or different based on the corresponding standard deviations.

A determination as to whether two methylation levels are the same or different can be made using known methods of comparison and statistical analyses. Typically, if the difference between the two methylation levels is smaller than the standard deviation of either methylation level then the two methylation levels are statistically indistinguishable and will be considered "the same." If the difference between the two methylation levels is greater than the standard deviation of either methylation level then the two methylation levels are statistically distinguishable and can be considered to be "different." If desired the difference in beta value required for considering two methylation levels to be different can be larger than a single standard deviation such that for the values to be considered statistically distinguishable, the difference between the two methylation levels must be greater than two standard deviations of either methylation level, greater than three standard deviations of either methylation level, or greater than 5 or more standard deviations of either methylation level.

Some embodiments relate to a DNA methylation level detection system with a scanner capable of reading methylation levels for at least one locus or a plurality of loci in a sample DNA. The scanner can be any known in the art or configured specifically for this purpose such as a BeadArray scanner available from Illumina, Inc. (San Diego, Calif.), scanners available from other commercial entities such as Affymetrix, Inc. (Santa Clara, Calif.) or Axon Instruments (acquired by Molecular Devices, Sunnyvale, Calif.), or scanners based on technology commonly used in fluorescent microscopes. In some embodiments, the system can also contain an algorithm configured to compare the measured sample DNA methylation levels against data representing the standard deviation of methylation measurements of DNA. The algorithm can be programmed to operate in accordance with the methods set forth herein using computer programming methods known or readily identifiable to those skilled in the art. An exemplary computer implemented module for analyzing methylation levels is described in the "BeadStudio Methylation Module User Guide" available from Illumina (San Diego, Calif.).

In some embodiments, the methylation levels are determined using a bead array from a company such as Illumina, Inc. (San Diego, Calif.). However, other types of DNA arrays, such as those manufactured by Affymetrix, Inc. (San Jose, Calif.) are also contemplated. The data imported into a methylation analysis algorithm can be obtained by any method, including those described above. Those skilled in the art will know or be able to determine appropriate format in which to place methylation data for importation and analysis into a methylation analysis algorithm. Similarly those skilled in the art will know or be able to determine how to modify any of a variety of methylation analysis algorithms to include a method for determining standard deviation of methylation levels or a method for comparing methylation levels in accordance with the teaching provided herein.

The methods set forth herein exploit the potential of genomic methylation of CpG dinucleotides and other genomic DNA loci as indicators of the presence of a condition in an individual and provides a reliable diagnostic and/or prognostic method applicable to any condition associated with altered levels or patterns of genomic methylation of CpG dinucleotides or other loci. The methods can be applied to the characterization, classification, differentiation, grading, staging, diagnosis, or prognosis of a condition characterized by a pattern of one or more methylated genomic CpG dinucleotide sequences that is distinct from the pattern of one or more methylated genomic CpG dinucleotide sequences exhibited in the absence of the condition. For example, a method set forth herein can be used to determine whether the methylation level for a sample suspected of being affected by a disease or condition is the same or different compared to a sample that is considered "normal" with respect to the disease or condition.

In particular embodiments, the methods can be directed to diagnosing an individual with a condition that is characterized by a methylation level and/or pattern of methylation at particular loci in a test sample that are distinct from the methylation level and/or pattern of methylation for the same loci in a sample that is considered normal or for which the condition is considered to be absent. The methods can also be used for predicting the susceptibility of an individual to a condition that is characterized by a level and/or pattern of methylated loci that is distinct from the level and/or pattern of methylated loci exhibited in the absence of the condition.

Exemplary conditions that are suitable for analysis using the methods set forth herein can be, for example, cell proliferative disorder or predisposition to cell proliferative disorder; metabolic malfunction or disorder; immune malfunction, damage or disorder; CNS malfunction, damage or disease; symptoms of aggression or behavioral disturbance; clinical, psychological and social consequences of brain damage; psychotic disturbance and personality disorder; dementia or associated syndrome; cardiovascular disease, malfunction and damage; malfunction, damage or disease of the gastrointestinal tract; malfunction, damage or disease of the respiratory system; lesion, inflammation, infection, immunity and/or convalescence; malfunction, damage or disease of the body as an abnormality in the development process; malfunction, damage or disease of the skin, the muscles, the connective tissue or the bones; endocrine and metabolic malfunction, damage or disease; headache or sexual malfunction, and combinations thereof.

Abnormal methylation of CpG islands associated with tumor suppressor genes can cause decreased gene expression. Increased methylation of such regions can lead to progressive reduction of normal gene expression resulting in the selection of a population of cells having a selective growth advantage. Conversely, decreased methylation (hypomethylation) of oncogenes can lead to modulation of normal gene expression resulting in the selection of a population of cells having a selective growth advantage.

Accordingly, in particular embodiments a disease or condition to be analyzed with respect to methylation levels is cancer. Exemplary cancers that can be evaluated using a method of the invention include, but are not limited to cancer of the breast, prostate, lung, bronchus, colon, rectum, urinary bladder, kidney, renal pelvis, pancreas, oral cavity or pharynx (Head & Neck), ovary, thyroid, stomach, brain, esophagus, liver, intrahepatic bile duct, cervix, larynx, soft tissue such as heart, testis, gastro-intestinal stroma, pleura, small intestine, anus, anal canal and anorectum, vulva, gallbladder, bones, joints, hypopharynx, eye or orbit, nose, nasal cavity, middle ear, nasopharynx, ureter, peritoneum, omentum, or mesentery. Other cancers that can be evaluated include, for example, Chronic Myeloid Leukemia, Acute Lymphocytic Leukemia, Malignant Mesothelioma, Acute Myeloid Leukemia, Chronic Lymphocytic Leukemia, Multiple Myeloma, Gastrointestinal Carcinoid Tumors, Non-Hodgkin Lymphoma, Hodgkin Lymphoma or Melanomas of the skin.

With particular regard to cancer, changes in DNA methylation have been recognized as one of the most common molecular alterations in human neoplasia. Hypermethylation of CpG islands located in the promoter regions of tumor suppressor genes is a well-established and common mechanism for gene inactivation in cancer (Esteller, *Oncogene* 21(35): 5427-40 (2002)). In contrast, a global hypomethylation of genomic DNA is observed in tumor cells; and a correlation between hypomethylation and increased gene expression has been reported for many oncogenes (Feinberg, *Nature* 301(5895): 89-92 (1983), Hanada, et al., *Blood* 82(6): 1820-8 (1993)). Cancer diagnosis or prognosis can be made in a method set forth herein based on the methylation state of particular sequence regions of a gene including, but not limited to, the coding sequence, the 5'-regulatory regions, or other regulatory regions that influence transcription efficiency.

The prognostic methods set forth herein are useful for determining if a patient is at risk for recurrence. Cancer recurrence is a concern relating to a variety of types of cancer. The prognostic methods can be used to identify surgically treated patients likely to experience cancer recurrence so that they can be offered additional therapeutic options, including preoperative or postoperative adjuncts such as chemotherapy, radiation, biological modifiers and other suitable therapies. The methods are especially effective for determining the risk of metastasis in patients who demonstrate no measurable metastasis at the time of examination or surgery.

The prognostic methods also are useful for determining a proper course of treatment for a patient having cancer. A course of treatment refers to the therapeutic measures taken for a patient after diagnosis or after treatment for cancer. For example, a determination of the likelihood for cancer recurrence, spread, or patient survival, can assist in determining whether a more conservative or more radical approach to therapy should be taken, or whether treatment modalities should be combined. For example, when cancer recurrence is likely, it can be advantageous to precede or follow surgical treatment with chemotherapy, radiation, immunotherapy, biological modifier therapy, gene therapy, vaccines, and the like, or adjust the span of time during which the patient is treated.

A reference genomic DNA (for example, gDNA considered "normal") and a test genomic DNA that are to be compared in a diagnostic or prognostic method, can be obtained from different individuals, from different tissues, and/or from different cell types. In particular embodiments, the genomic DNA samples to be compared can be from the same individual but from different tissues or different cell types, or from tissues or cell types that are differentially affected by a disease or condition. Similarly, the genomic DNA samples to be compared can be from the same tissue or the same cell type, wherein the cells or tissues are differentially affected by a disease or condition.

A reference genomic DNA, to which a test genomic DNA will be compared in a diagnostic or prognostic method, can be obtained from age-matched normal classes of adjacent tissues, or with normal peripheral blood lymphocytes. The reference gDNA can be obtained from non-tumorous cells from the same tissue as the tissue of the neoplastic cells to be tested. The reference DNA can be obtained from in vitro cultured cells which can be manipulated to simulate tumor cells, or can be manipulated in any other manner which yields methylation levels which are indicative of cancer or another condition of interest.

It is understood that a reference methylation level to which a test methylation level is compared in a diagnostic or prognostic method will typically correspond to the level of one or more methylated genomic CpG dinucleotide sequences present in a corresponding sample that allows comparison to the desired phenotype. For example, in a diagnostic application a reference level can be based on a sample that is derived from a cancer-free origin so as to allow comparison to the biological test sample for purposes of diagnosis. In a method of staging a cancer it can be useful to apply in parallel a series of reference levels, each based on a sample that is derived from a cancer that has been classified based on parameters established in the art, for example, phenotypic or cytological characteristics, as representing a particular cancer stage so as to allow comparison to the biological test sample for purposes of staging. In addition, progression of the course of a condition can be determined by determining the rate of change in the level or pattern of methylation of genomic CpG dinucleotide sequences by comparison to reference levels derived from reference samples that represent time points within an established progression rate. It is understood, that the user will be able to select the reference sample and establish the reference level based on the particular purpose of the comparison.

Definitions

"Instructions" refer to computer-implemented steps for processing information in the system. Instructions can be implemented in software, firmware or hardware and include any type of programmed step undertaken by components of the system. Any of the method steps set forth herein can be provided as instructions for a computer implemented process.

A "microprocessor" or "processor" may be any conventional general purpose single- or multi-chip microprocessor such as a Pentium® processor, MIPS® processor, a Power PC®, processor, or an ALPHA® processor. In addition, the microprocessor may be any conventional special purpose microprocessor such as a digital signal processor or a graphics processor. The microprocessor typically has conventional address lines, conventional data lines, and one or more conventional control lines.

The system is comprised of various "modules" as discussed in detail below. As can be appreciated by one of ordinary skill in the art, each of the modules includes various sub-routines, procedures, definitional statements or macros. Each of the modules are typically separately compiled and linked into a single executable program. Therefore, the following description of each of the modules is used for convenience to describe the functionality of the preferred system. Thus, the processes that are performed by each of the modules may be arbitrarily redistributed to one of the other modules, combined together in a single module, or made available in, for example, a shareable dynamic link library.

The system may include any type of electronically connected group of computers including, for instance, the following "networks": Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration. As used herein, an Internet includes network variations such as public internet, a private internet, a secure internet, a private network, a public network, a value-added network, an intranet, and the like.

The system may be used in connection with various "operating systems" such as Unix or WINDOWS, including WINDOWS 98, WINDOWS NT, WINDOWS XP and WINDOWS VISTA.

The system or software may be written in any "programming language" such as C, C++, BASIC, Pascal, Java, and FORTRAN and ran under any well-known operating system. C, C++, BASIC, Pascal, Java, and FORTRAN are industry standard programming languages for which many commercial compilers can be used to create executable code.

System Overview

FIG. 1 provides an overview of a DNA methylation level detection system 100. The system includes a main system 101 that is linked to a scanner 102 that communicates with a comparison module 104. The scanner 102 can also contain an array 103 on which sample DNA (DNA1 105 and DNA2 107) can be assayed for their respective methylation levels.

The main system 101 can be any well known computer. A computer system useful in the invention can include a conventional or general purpose computer system that is programmed with, or otherwise has access to, one or more program modules involved in the analysis of methylation data. An exemplary computer system that can be used is described, for example, in U.S. Pat. No. 7,035,740, which is incorporated herein by reference. Components of a computer system used in accordance with the description set forth herein can include, but are not limited to personal computer systems, such as those based on Intel®, IBM®, or Motorola® microprocessors; or work stations such as a SPARC workstation or UNIX workstation. Useful systems include those using the Microsoft Windows, UNIX or LINUX operating system. A MacIntosh system can also be used and will preferably have windows compatible software. The systems and methods described herein can also be implemented to run on client-server systems or wide-area networks such as the Internet.

A computer system can be configured to operate as either a client or server and can include one or more processors which are coupled to a random access memory (RAM). A processor included in the system can execute instructions included in one or more program modules. Program modules can be integrated into hardware components of the system, such as firmware encoded on a ROM chip, or may be introduced into the system as separately available software. In particular embodiments, high-level algorithms are written in MATLAB. Using MATLAB Compiler and/or Mathworks' "Builder for NET", the MATLAB code can be converted automatically to C or C++, and then by calling (transparently) the C compiler, an executable code (machine code) can be generated. Alternatively, shared libraries (DLL in Windows) can be made, and then used inside a C, C++, C#, Visual Basic or Java program. If desired the algorithms can be written in a lower level language such as C to begin with. A C# interface can be used as well. Other computer languages known in the art can be used as well.

The function of the comparison module 104 is discussed below in more detail. The scanner 102 may communicate with the comparison module 104 through any well-known means, including high-speed digital data lines or wireless communication systems. One example of such as scanner is the Illumina BeadArray scanner (Illumina, Inc., San Diego, Calif.).

The module 104 may be written in any conventional programming language, for example, those set forth above.

Process Overview

Figure 2:
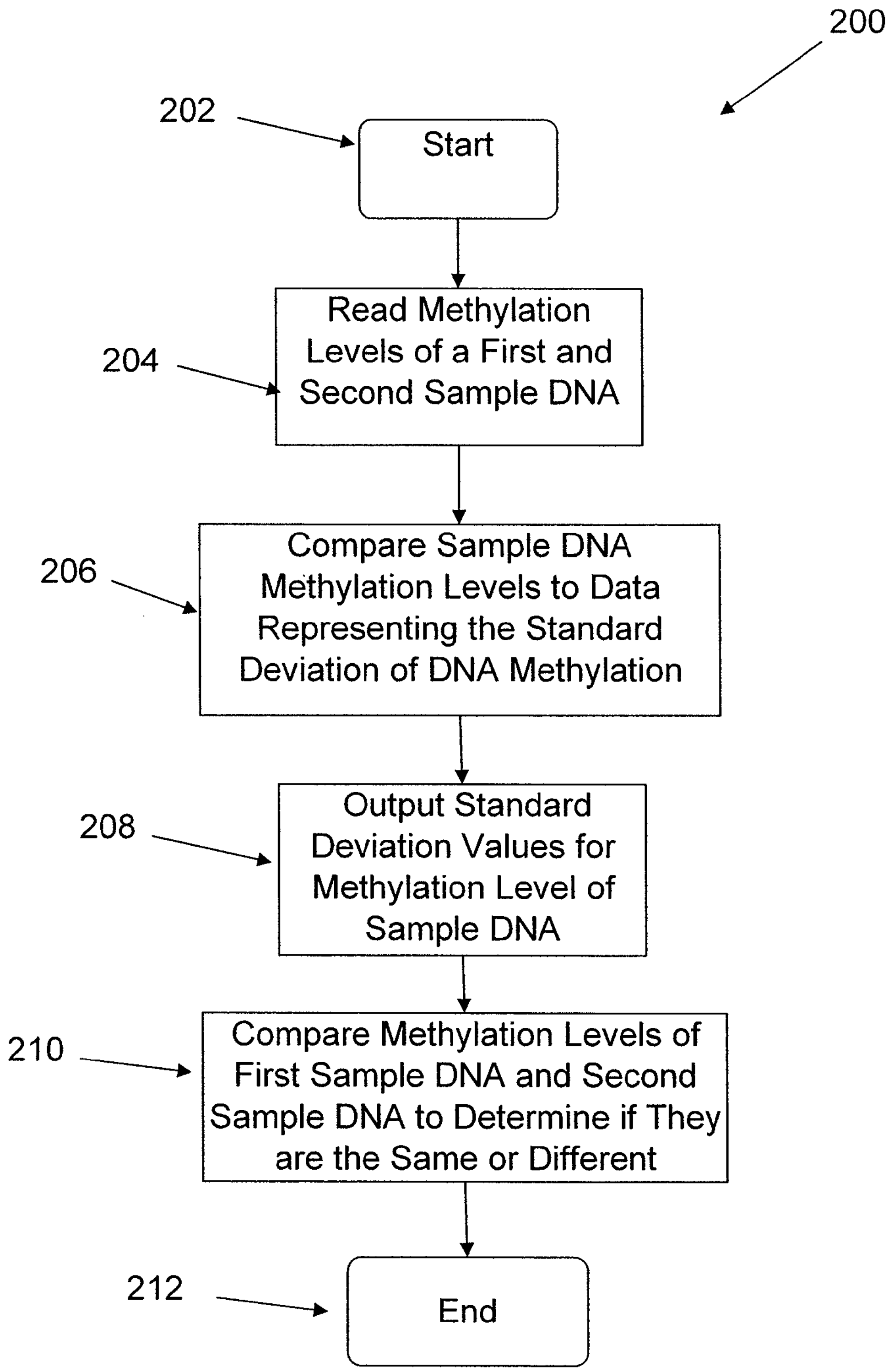
FIG. 2 is a process flow diagram illustrating an overview of one embodiment of a DNA methylation level detection system.

FIG. 2 provides one embodiment of a process 200 for DNA methylation level detection. The process 200 begins at a start state 202 and then moves to a state 204 where methylation levels of a first and second (and/or additional) sample DNA (e.g. DNA1 and DNA2 from FIG. 1) are received from the scanner and stored to a database. The database for storing the methylation levels can be the database 106 or any other database within the system 100.

Once the initial methylation levels of sample DNA are obtained by the system from the scanner at state 204, the process 200 moves to a state 206 wherein the methylation levels of sample DNA are compared to data representing the standard deviation of DNA methylation. For example, the system may compare the methylation levels of the sample DNA to a table, graph or equation relating median DNA methylation values to values of standard deviation of DNA methylation values.

Once the methylation levels of the sample DNA have been compared to data representing the standard deviation of DNA methylation at the state 206, the process 200 moves to a state 208 wherein the standard deviation values for the methylation levels of the sample DNA are outputted from the system. Such output can occur, for example, as a display on a screen or as communication to another database or system for further process. After the standard deviation values for the methylation state of the sample DNA is outputted, the system moves to a comparison state 210 wherein the methylation levels of the first and second (and/or additional) sample DNA are compared to each other in the context of the recently computed standard deviations of each methylation level to determine if the methylation levels of the sample DNA are statistically the same or different. The results of the comparison can be output as a display on a screen, as a hardcopy print out or as data stored on a computer readable memory. The results can be displayed in any convenient format such as a table, graph or heat map. Exemplary displays are described in the "BeadStudio Methylation Module User Guide" available from Illumina (San Diego, Calif.). The system 200 then moves to an end state 212.

The following examples are provided for illustrative purposes only, and are in no way intended to limit the scope of the present invention.

EXAMPLE 1

In order to estimate standard deviation of Beta (Methylation value) as a function of the mean, a training data set was generated which used genomic DNA mixtures to achieve the full range of methylation states. Multiple replicates were used, and β values were computed for each sample.

Samples selected for generating dilution series were cancer cell lines K562 (Human Chronic Myelogenous Leukemia, Bone Marrow with overall low methylation level) and Raji (Human B-Lymphoma with overall high methylation level). DNA mixtures were prepared twice and bisulfite converted using Zymo research EZ methylation kit. Each conversion of 1 μg of DNA produced enough material to generate 4 replicates in the methylation assay (Table 2).

TABLE 2

| Genomic DNA mixtures | | | | | |
|---|---|---|---|---|---|
| Sample | Mix 1 | K562(low methyl) | Raji(high methyl) | ng K562 | ng Raji |
| 1 | 100%:0% | 100 | 0 | 1000 | 0 |
| 2 | 95%:5% | 95 | 5 | 950 | 50 |
| 3 | 90%:10% | 90 | 10 | 900 | 100 |
| 4 | 75%:25% | 75 | 25 | 750 | 250 |
| 5 | 50%:50% | 50 | 50 | 500 | 500 |
| 6 | 25%:75% | 25 | 75 | 250 | 750 |
| 7 | 10%:90% | 10 | 90 | 100 | 900 |
| 8 | 5%:95% | 5 | 95 | 50 | 950 |
| 9 | 0%:100% | 0 | 100 | 0 | 1000 |

Mixed samples were used in the GoldenGate®-based assay for methylation detection as described in Bibikova et al., supra (2006). A brief summary of the assay with reference to FIG. 5 follows. Non-methylated cytosines (C) were converted to uracil (U) when treated with bisulfite, while methylated cytosines remained unchanged. Because the hybridization behavior of uracil is similar to that of thymine (T), the detection of the methylation status of a particular cytosine was carried out following bisulfite treatment by using a genotyping assay for a C/T polymorphism. For each CpG site, two pairs of probes were designed to interrogate either the top or bottom strand: an allele-specific oligonucleotide (ASO) and locus-specific oligonucleotide (LSO) probe pair for the methylated state of the CpG site and a corresponding ASO-LSO pair for the non-methylated state.

Figure 5:
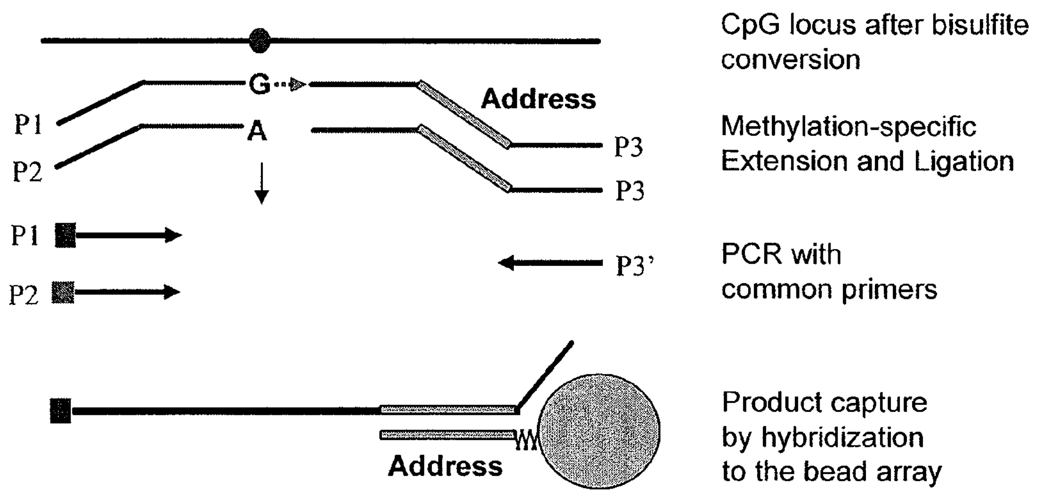
FIG. 5 shows a diagrammatic representation of the GoldenGate®-based assay for methylation detection.

The assay procedure is similar to that described previously for standard SNP genotyping where methylated and non-methylated cytosines are treated as different alleles (see FIG. 5). Bisulfite-treated, biotinylated genomic DNA (gDNA) was immobilized on paramagnetic beads. Pooled query oligos (i.e. ASO probes and LSO probes) were annealed to the bisulfite treated gDNA, and then washed to remove excess or mishybridized oligos. Hybridized oligos were then extended and ligated to generate amplifiable templates. Requiring the joining of two fragments to create a PCR template in this scheme provides an additional level of locus specificity. It is unlikely that any incorrectly hybridized ASOs and LSOs will be adjacent, and therefore should not be able to ligate after ASO extension. A PCR reaction was performed with fluorescently labeled universal PCR primers including the P1 and P2 primers which annealed to the P1 and P2 priming sites, respectively, of the ASO portions of the ligated ASO-LSO probes and further including the P3 primer which annealed to the P3 priming site on the LSO portions of the ligated ASO-LSO probes. The PCR product was then converted to a single-stranded DNA and hybridized to the universal array. According to the scheme of FIG. 5, non-methylated alleles are detected based on signal produced by the label on the P1 primer and methylated alleles are detected based on signal produced by the label on the P2 primer.

Each methylation data point is represented by fluorescent signals from the M (methylated) and U (unmethylated) alleles. Methylation level (beta-value) of an interrogated CpG site is calculated as ratio of fluorescent signals from two alleles using Formula 1, as set forth previously herein, to obtain beta values. Methods for obtaining beta value are also described in Bibikova et al., *Genome Research,* 16:383-393 (2006) and in the "BeadStudio Methylation Module User Guide" available from Illumina (San Diego, Calif.).

TABLE 3

| Sample layout | | | | | |
|---|---|---|---|---|---|
| | 1 | 2 | 3 | 4 | 5 |
| A | K100_R0_1a | K95_R5_1a | K90_R10_1a | K75_R25_1a | K50_R50_1a |
| B | K100_R0_1b | K95_R5_1b | K90_R10_1b | K75_R25_1b | K50_R50_1b |
| C | K100_R0_1c | K95_R5_1c | K90_R10_1c | K75_R25_1c | K50_R50_1c |
| D | K100_R0_1d | K95_R5_1d | K90_R10_1d | K75_R25_1d | K50_R50_1d |
| E | K100_R0_2a | K95_R5_2a | K90_R10_2a | K75_R25_2a | K50_R50_2a |
| F | K100_R0_2b | K95_R5_2b | K90_R10_2b | K75_R25_2b | K50_R50_2b |
| G | K100_R0_2c | K95_R5_2c | K90_R10_2c | K75_R25_2c | K50_R50_2c |
| H | K100_R0_2d | K95_R5_2d | K90_R10_2d | K75_R25_2d | K50_R50_2d |

| | 6 | 7 | 8 | 9 |
|---|---|---|---|---|
| A | K25_R75_1a | K10_R90_1a | K5_R95_1a | K0_R100_1a |
| B | K25_R75_1b | K10_R90_1b | K5_R95_1b | K0_R100_1b |
| C | K25_R75_1c | K10_R90_1c | K5_R95_1c | K0_R100_1c |
| D | K25_R75_1d | K10_R90_1d | K5_R95_1d | K0_R100_1d |
| E | K25_R75_2a | K10_R90_2a | K5_R95_2a | K0_R100_2a |
| F | K25_R75_2b | K10_R90_2b | K5_R95_2b | K0_R100_2b |
| G | K25_R75_2c | K10_R90_2c | K5_R95_2c | K0_R100_2c |
| H | K25_R75_2d | K10_R90_2d | K5_R95_2d | K0_R100_2d |

Mixtures - from two different conversions

Figure 4:
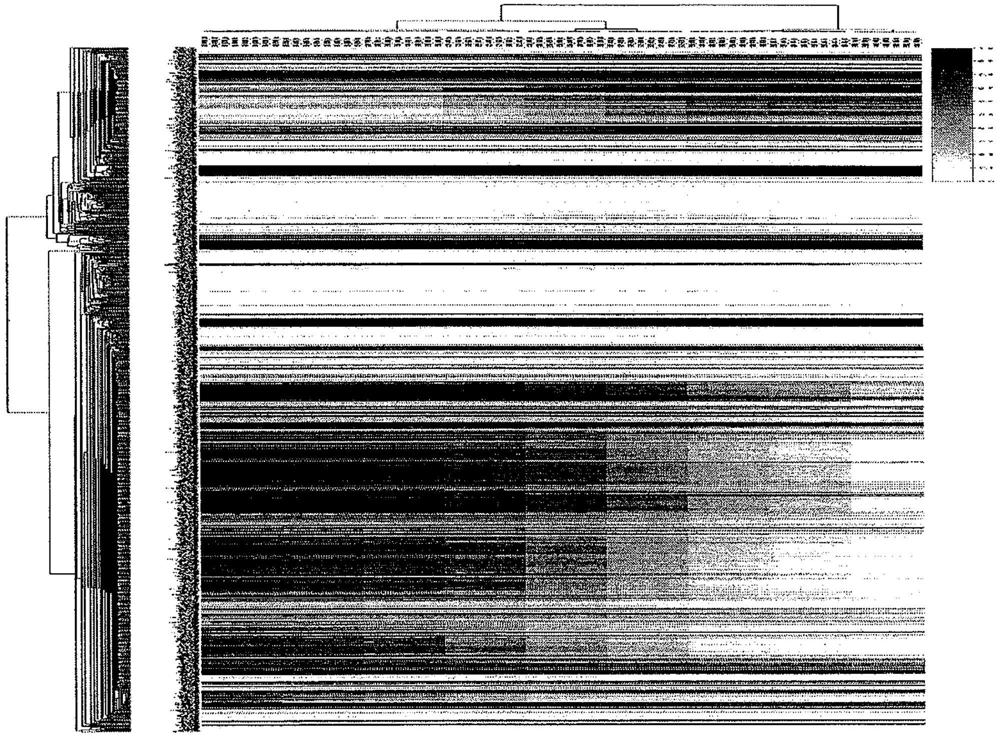
FIG. 4 represents a heatmap of sample dilutions, where white color indicates non-methylated loci, and black color indicates methylated loci.

DNA mixtures covering the whole range of beta values from 0 (unmethylated) to 1 (fully methylated) according to the scheme shown in Table 3, were detected using the GoldenGate®-based methylation assay. As shown in the sample scheme, two DNA mixtures were evaluated (mixture 1 in rows A through D; and mixture 2 in rows E through H) and for each DNA mixture 4 technical replicates were separately assayed from bisulfite conversion step (the technical replicates are indicated by small case letters a through d). Dilutions are indicated and follow the scheme in Table 2. For example, K100_R0 indicates a mixture of 100% K562 cells and 0% Raji cells. Likewise, the sample K25_R75 indicates a mixture of 25% K562 cells and 75% Raji cells. The heatmap (FIG. 4) illustrates results from the dilution series in which unmethylated loci are in white, and methylated loci are in black.

Beta values were determined and the data resulting from determining methylation level for the DNA mixtures was plotted as shown in FIG. 3.

The data shown in FIG. 3 is used to determine whether the methylation level of a locus in a first sample DNA is the same or different in comparison to the methylation level of the locus in a second sample DNA. The locus has a beta value of 0.3 in the first sample and a beta value of 0.6 in the second sample. The standard deviation for the methylation level of the locus in the first sample is 0.04 and the standard deviation for the methylation level of the locus in the second sample is 0.05. Because the difference between methylation levels of 0.3 and 0.6 is 0.3 and this is larger than 2 times the larger of the two standard deviations (i.e. 2*0.05) the two methylation levels are considered to be different.

EQUIVALENTS

The foregoing written specification is considered to be sufficient to enable one skilled in the art to practice the present embodiments. The foregoing description and Examples detail certain preferred embodiments and describes the best mode contemplated by the inventors. It will be appreciated, however, that no matter how detailed the foregoing may appear in text, the present embodiments may be practiced in many ways and the present embodiments should be construed in accordance with the appended claims and any equivalents thereof.

The term "comprising" is intended herein to be open-ended, including not only the recited elements, but further encompassing any additional elements.

What is claimed is:

1. A DNA methylation level detection system, comprising:

a scanner for reading methylation levels for a plurality of loci in a sample DNA;

a first module for receiving the methylation levels from the scanner and communicating said levels to a database;

a second module configured to compare said methylation levels against data representing the standard deviation of methylation measurements of DNA; and a third module for outputting the standard deviation values.

2. The system of claim 1, wherein said scanner comprises an array.

3. The system of claim 2, wherein said plurality of loci comprises at least 100 loci that are measured simultaneously on said array.

4. The system of claim 1, wherein said data correlates standard deviation of methylation level as a function of methylation level.

5. The system of claim 1, wherein said data comprises different standard deviation values for different methylation levels.

6. The system of claim 5, wherein said data comprises said different standard deviation values occurring along a parabola when correlated to said different methylation levels.

7. The system of claim 1, further comprising modules configured to:

create a training set comprising mixtures of DNA with varying methylation levels, wherein said training set comprises replicates of said mixtures;

determine the methylation level of at least one locus in said mixtures of said training set;

determine standard deviation values for said methylation levels determined for said replicates of said training set; and correlate said standard deviation values and said methylation levels determined for said training set.

8. The system of claim 7, wherein said mixtures of said training set comprise different ratios of genomic DNA from at least one cell population with highly methylated DNA and at least one cell population with minimally methylated DNA.

9. The system of claim 8, wherein said methylation levels for said mixtures of said training set vary from 0 to 1.

10. The system of claim 9, further comprising identifying at least three regions from 0 to 1, determining the median of the methylation levels for each of said regions and fitting a parabola to said median for each of said regions.

11. The system of claim 9, wherein said standard deviation values comprise the $95^{th}$ percentile standard deviation values.

* * * * *